United States Patent [19]

Aono et al.

[11] Patent Number: 5,483,440
[45] Date of Patent: Jan. 9, 1996

[54] REMOTE CONTROL APPARATUS AND CONTROL METHOD THEREOF

[75] Inventors: Toshihiro Aono; Kohji Kamejima, both of Ibaraki; Tomoyuki Hamada, Abiko, all of Japan

[73] Assignee: Hitachi, Ltd., Tokyo, Japan

[21] Appl. No.: 255,943

[22] Filed: Jun. 7, 1994

[30] Foreign Application Priority Data

Jun. 7, 1993 [JP] Japan .................... 5-136018

[51] Int. Cl.$^6$ .................. G05B 19/00; G06F 15/00
[52] U.S. Cl. ............... 364/167.01; 364/188; 364/478; 318/568.25
[58] Field of Search ............ 364/167.01, 468, 364/478, 188, 424.01, 424.02; 318/567, 568.1, 568.11, 568.25; 395/912; 414/4, 5

[56] References Cited

U.S. PATENT DOCUMENTS

| | | | |
|---|---|---|---|
| 4,956,790 | 9/1990 | Tsuchihashi et al. | 364/188 |
| 5,038,089 | 8/1991 | Szakaly | 318/568.11 |
| 5,046,022 | 9/1991 | Conway et al. | 364/190 |
| 5,307,271 | 4/1994 | Everett, Jr. et al. | 364/424.02 |

FOREIGN PATENT DOCUMENTS

| | | |
|---|---|---|
| 1-131904 | 5/1989 | Japan . |
| 1-310873 | 12/1989 | Japan . |
| 2-137072 | 5/1990 | Japan . |

*Primary Examiner*—Paul P. Gordon
*Attorney, Agent, or Firm*—Antonelli, Terry, Stout & Kraus

[57] ABSTRACT

This invention relates to a remote control apparatus. Guidance-control equipment and a control apparatus are installed at a site of a work at which the operation object is positioned. An input apparatus including a program input apparatus for inputting a work program determining the operation of an operation appliance and a time schedule input apparatus for inputting a time schedule as an actuation timing of the operation of the operation appliance determined by the work program, is disposed at an operation position spaced apart from the site of the work. Further, a work program memory, a time schedule controller, work interpretation apparatus, a work environment map memory, and a display device are disposed at the operation position.

15 Claims, 18 Drawing Sheets

FIG. 2

| GRIP (A) | 4001 |
|---|---|
| | SEARCH AN ARTICLE HAVING A COMMON PORTION WITH REGION W HAVING DISTANCE w FROM REGION INTERPOSED BETWEEN STRAIGHT LINES $x=x_4$, $y=r_r$, PASSING THROUGH POSITION $(x_r, y_r, z_r)$ OF GRIPPER OF ROBOT AND STRAIGHT LINES PASSING THROUGH POSITION $(x0, y0, z0)$ OF ARTICLE A. ← 4002 |
| | SET GREATER ONE OF THE z COORDINATES OF THE HIGHEST POINT OF ARTICLE HAVING COMMON PORTION WITH W AND z COORDINATES OF THE HIGHEST POINT OF A, TO h. |
| | MOVE GRIPPER TO $(x_r, y_r, h+d)$ |
| | SET DIRECTION OF NORMAL OF GRIPPER TO $n = (-n_x, -n_y, -n_z)$ |
| | MOVE GRIPPER TO $(x0+D^*n_x, y0+D^*n_y, h+d)$ |
| | MOVE GRIPPER TO $(x0+D^*n_x, y0+D^*n_y, z0+D^*n_z)$ |
| | OPEN GRIPPER |
| | MOVE GRIPPER TO $(x0, y0, z0)$ |
| | CLOSE GRIPPER |

| obj1 ~5001 | |
|---|---|
| POSITION | (x1,y1,z1) ~5002 |
| NORMAL | (l1,m1,n1) ~5003 |
| SUPPORT ARTICLE AND SUPPORT METHOD | obj0,on ~5004 |
| SHAPE | [(x11,y11,z11), (x12,y12,z12), (x13,y13,z13), (x14,y14,z14)]<br>[(x15,y15,z15), (x16,y16,z16), (x12,y12,z12), (x11,y11,z11)]<br>[(x18,y18,z18), (x17,y17,z17), (x13,y13,z13), (x14,y14,z14)]<br>[(x14,y14,z14), (x13,y13,z13), (x17,y17,z17), (x18,y18,z18)]<br>[(x16,y16,z16), (x17,y17,z17), (x13,y13,z13), (x12,y12,z12)]<br>[(x18,y18,z18), (x15,y15,z15), (x11,y11,z11), (x14,y14,z14)] ~5005 |

FIG. 7

| 10 : 10′ 10″ | TRANSPORT | (obj0, obj3) |
| 10 : 10′ 18″ | TRANSPORT | (obj1, obj2) |
| 10 : 10′ 29″ | REMOVAL | (obj4) |
| 10 : 11′ 00″ | EXCHANGE | (obj5, obj6, obj7, obj8, obj9) |

2001    2002

| 11 : 05' 00" | TRANSPORT (D,C) |
| 11 : 05' 30" | TRANSPORT (E,A) |
| 11 : 06' 00" | TRANSPORT (D,B) |

| 8 : 15' 00" | COMMAND 1 |
| --- | --- |
| 8 : 15' 30" | COMMAND 2 |
| 8 : 16' 10" | COMMAND 3 |
| 8 : 17' 00" | COMMAND 4 |

| 8 : 15' 00" | COMMAND 1 |
| --- | --- |
| 8 : 15' 30" | COMMAND 2 |
| 8 : 20' 00" | TRANSPORT (D,A) |
| 8 : 20' 40" | TRANSPORT (C,B) |
| 8 : 21' 20" | COMMAND 3 |
| 8 : 22' 00" | COMMAND 4 |

… 1 …

REMOTE CONTROL APPARATUS AND CONTROL METHOD THEREOF

BACKGROUND OF THE INVENTION

This invention generally relates to a remote operation. More particularly, it relates to a remote operation apparatus and a method thereof, capable of easily changing a work program when the work cannot be carried out as the program directs an initial work program due to the corrosion of the object, or the like.

A remote operation apparatus according to the prior art employs the construction in which master arms and slave arms are so assembled as to perform mutually analogous operations, the slave arms are controlled by manipulating the master arms, and a burden to an operator is reduced by rendering a ratio of similarity of the operations of the master arms and the slave arms variable (refer to JP-A-1-310873).

To carry out an elaborate work without depending on an operator, on the other hand, a system is known in which a work message is generated in accordance with an intention of a work and an operation environment by inputting a work name and is then sent to a robot (refer to JP-A-1-131904).

According to the system described in JP-A-1-310873, an operation can be provided easily, but no failure is permitted because the movement of a hand of an operator directly leads to the movement of a robot. For this reason, the operator must continuously grip the master arm and keep his nerve at high tension while the robot is being operated. According to the system described in JP-A-1-131904, data on the robot and on a shape, strength and function of an operation object are necessary in order to practically convert the work name to a command to be applied to the robot. In the case of repair of an atomic power plant, etc., for example, degradation occurs in the object article, and the shape, the strength and the function of such an article change from time to time. Accordingly, the data given to the system cannot be said to be complete. In other words, the work cannot always be carried out as expected by the operator when he sets up the work program, and the work might result in failure.

In the remote operation apparatus according to the prior art, degradation occurs in the object article, and the shape, the strength and the function of the object article are likely to change. Accordingly, the data, given to the system cannot always be complete, and the work cannot always be carried out as expected when the operator sets up the work program, and the work sometimes results in failure. When an atomic power plant is to be repaired, this failure induces critical safety and economical problems.

Incidentally, a manipulator for conducting a work in an environment where an operation position and a site of a work are extremely remote from each other with a certain time delay is described in U.S. patent application Ser. No. 08/128,723 entitled "Remote Control Device and Method for Manipulator", filed on Sep. 30, 1993.

SUMMARY OF THE INVENTION

It is an object of the present invention to provide a remote operation apparatus, and a method therefor, capable of reliably controlling a control object positioned at a remote place, and a remote operation apparatus, and a method therefor, capable of easily changing a work program when a work cannot be carried out in accordance with an initial work program due to the change of an operation object with time, and so forth.

To accomplish the objects described above, a remote operation apparatus according to the present invention comprises means for taking in work environment data of a site of a work when the work is controlled at an operation point spaced apart from a site of the work, means for displaying the work environment data at the operation point and work program means for confirming display of the display means and suitably changing the work program when display is different from a predetermined work.

The remote operation apparatus may comprise guidance-control equipment disposed at the site of the work, for controlling and monitoring a robot, and taking in the work environment data, and program assistance equipment disposed at the operation point, for inputting the work environment data and generating a robot control command, wherein the program assistance equipment is provided with work program means for displaying the work environment data, monitoring a robot operation on the basis of the robot control command generated, and capable of changing at an arbitrary time the work program when the robot operation is different from a predetermined work.

The work program means may be so constituted as to perform simulation of the work program, to display the simulation result, to confirm the progress of the work from the display and to change the work program.

Further, the guidance-control equipment may comprise a controller for controlling the robot on the basis of the work program generated by the program assistance equipment, an image processor for recognizing the work object article and the robot, and generating the work environment data on the basis of the recognition result, and a communication controller for transmitting the work environment data to the program assistance equipment.

The program assistance equipment may comprise a display device for displaying the work environment data transmitted from the guidance-control equipment, an input apparatus for generating the work program, a control command generation apparatus for generating a robot control command on the basis of the work program, and a communication controller for transmitting the robot control command to the guidance-control equipment.

The program assistance equipment may be so constituted as to simulate the robot operation by work simulation equipment when a program of the work is generated by the input apparatus, to conduct programming of the work while the robot operation is being confirmed, and to register the confirmed program to the control command generation apparatus.

Further, the controller may be so constituted as to read the changed work program in accordance with the operation of the robot and to change the robot operation.

The control command generation apparatus may comprises a time schedule, a work program memory, a work environment map and a work interpretation apparatus so that a program of a work is read out from the work program memory on the basis of a time schedule of a work stored in the time schedule to the work interpretation apparatus, and the work interpretation apparatus looks up the data of the work environment map and generates the robot control command in accordance with the program.

A remote operation method of the invention comprises taking in a work environment data of a site of a work when the work is manipulated at an operation point spaced apart from the site of the work, displaying the work environment data at the operation point, and changing at an arbitrary time the work program when the display content is different from a predetermined work.

When the work program is changed, simulation of the work program may be confirmed so as to modify the program.

An atomic power plant repair system is equipped with any one of the remote operation apparatuses described above.

According to the present invention, the program assistance equipment equipped with the input apparatus and the guidance-control equipment operates dispersedly and in parallel with each other. While the program assistance equipment (work program means) as a work station for assisting the program generates a robot control command on the basis of the work program and transmits it to the guidance-control equipment (input means), the input apparatus of the work program means accepts the change of the work program, and a work program afresh generated in this apparatus is temporarily stored in the input apparatus. At the same time, the guidance-control equipment controls and monitors the robot. The generation speed of the robot control command by the program assistance work station is by far higher than the actual robot operation. Therefore, there exists the time when the program assistance work station does not generate the robot control command. At this time, the new work program stored in the input apparatus is sent to the program assistance work station. According to this construction, the work program can be updated while the robot is being operated, so that even when the robot executes an unexpected operation, such an operation can be restored to the work as first intended by an operator by reviewing the work program, and the work can be reliably carried out.

BRIEF DESCRIPTION OF THE DRAWINGS

FIG. 2 is a table showing an example of work elements for executing the work program in an embodiment of the present invention;

FIG. 6 is a table showing an example of a work environment map in an embodiment of the present invention;

FIG. 7 is a table showing an example of a time schedule for executing the work program in an embodiment of the present invention;

DESCRIPTION OF THE PREFERRED EMBODIMENTS

Figure 1:
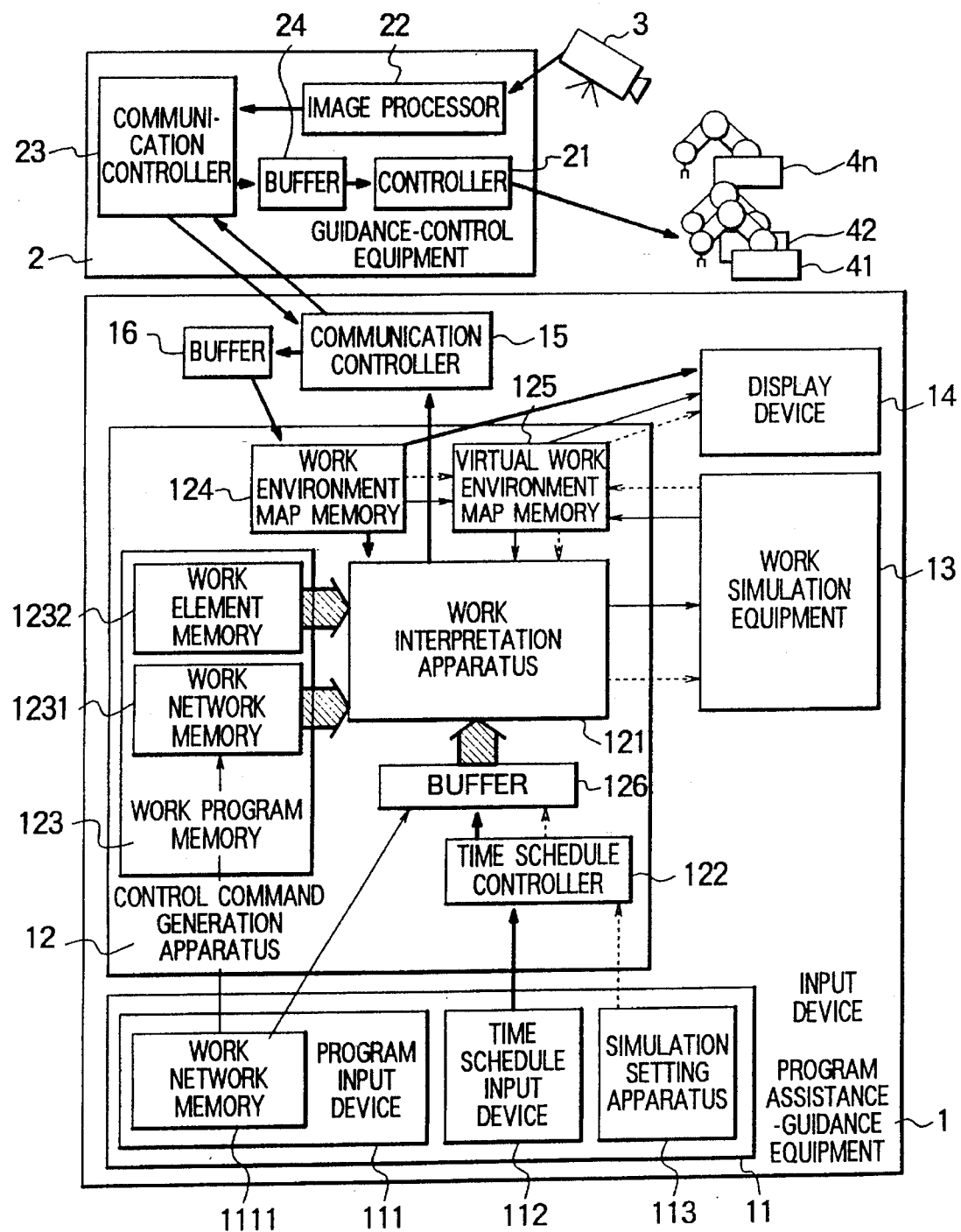
FIG. 1 is a structural view showing an embodiment of the present invention.

An embodiment of the present invention will be explained with reference to FIG. 1. As shown in FIG. 1, in a remote operation apparatus including a guidance-control equipment 2 which is disposed at a site of a work, controls and monitors robots 41 to 4n and receives work environment data, and project assistance equipment 1 which is disposed at a point of an operation, inputs a time schedule and generates robot control commands, the project assistance equipment 2 is provided with work planning means comprising an input device 11 for displaying the work environment data, monitoring the robot operations on the basis of the robot control commands generated, and changing the work project when the robots 41 to 4n execute different operations different from initial set operations, in addition to input of the time schedule based on an initial work project, and a control command generation device 12. The construction will be explained in further detail with reference to FIGS. 1 to 16.

The characterizing features of this embodiment reside in the following points:

(1) A work input operation can be made by simply inputting a time schedule which specifies in advance a work name indicating a content of a given work and a time schedule indicating the time to start the work;

(2) The work program can be changed by the program assistance equipment independently disposed at the site of the work without hindering the operations of the robots even when they are under the operation at the site of the work; and (3) The work program can be changed while simulation of the work is being carried out by work simulation equipment provided to the program assistance equipment.

These features render the operations easier, and even when the robots perform unexpected operations, they can be returned to the operations as initially intended by operators.

This embodiment will be first explained in connection with the [Apparatus Construction]. Next, in order to explain in which form the data are expressed by this apparatus, the explanation will be given on [Program Configuration], [Work Environment Map] and [Time Schedule]. Further, the operation of the present apparatus will be dividedly explained in conjunction with its two major functions, i.e., [Robot Control] and [Work Program Change].

In the apparatus of the present invention, a work interpretation apparatus plays a particularly important function. Accordingly, the operation of this apparatus will be separately explained in the item [Generation of Robot Control Command]. In the last place, a mechanism for accomplishing the features (1) to (3) of the present invention will be summarized.

[Apparatus Construction]

The remote operation apparatus is broadly divided into the project assistance equipment 1 disposed at a remote point and the guidance-control equipment 2 disposed at the site of the work.

As shown in FIG. 1, the program assistance equipment 1 generates the work program, expands it to robot control commands, and transmits them to the guidance-control equipment 2. The guidance-control equipment 2 selects and controls a control object from the robots 41 to 4n in accordance with the robot control command sent thereto from the program assistance equipment 1, generates a work environment model by processing images of the robots 41 to 4n as well as the work object, and sends the model to the program assistance equipment 1.

An input device 11 generates a work program comprising a time schedule of a given work and a program of the work. A program input device 111 generates the work program. The method of generating the program will be described in [Generation of Work Program]. The resulting program is stored in a work network memory 1111. A time schedule input device 112 generates a time schedule comprising a time and a work name. The method of generating the time schedule will be explained in [Generation of Work Program]. The resulting time schedule is temporarily stored in a time schedule input device 112. The time schedule input device 112 transfers the time schedule to a time schedule controller 122 when the control command generation apparatus 12 does not generate the commands. A simulation setting apparatus 113 sets a simulation time (a work of from which time to which time is to be simulated) and a speed of simulation. When the time on simulation reaches the time at which the work should be executed, the simulation setting apparatus 113 delivers only the work name in the time schedule corresponding to this time, which schedule is stored in the time schedule controller 122, to the work interpretation apparatus 121.

The time schedule controller 122 preserves the time schedule comprising the work name and the time at which the work is executed, as shown in FIG. 7. When the time at which the recorded work is to be executed is reached, the time schedule controller 122 sends the work name to the work interpretation apparatus 121 through a buffer 126. A work program memory 123 stores in advance a work program corresponding to the work name. A work environment map memory 124 stores the robots 41 to 4n, the work object, shapes of articles which might affect the work, their positions and directions, and their contact relationship with other articles (hereinafter, these data will be collectively referred to as the "work environment model"). The work environment model is sent in a predetermined cycle from the guidance-control equipment 2 through a communication controller 15 and a buffer 16, and the latest work environment model is always written into the work environment map memory 124.

The condition of simulation is written in the form of the work environment model into a virtual work environment map memory 125. When simulation is started, the work interpretation apparatus 121 copies the work environment map memory 124 to the virtual work environment map memory 125, and thereafter the content is updated by the work environment model which is sent from the work simulation equipment 13.

The work interpretation apparatus 121 calls out the program corresponding to the work name sent from the time schedule controller 122 or the program input device 111 through the buffer 126, from the work program memory 123, and generates the robot control commands by looking up the data of the work environment map memory 124 or the virtual work environment map memory 125. This command generation method will be explained in "Generation of Robot Control Commands". The work interpretation apparatus 121 reads the work name as soon as the work name reaches the buffer 126, and generates the robot control command, in principle, and only when the work interpretation apparatus 121 generates the robot control command for the work name which has previously reached, the subsequent work name is stored in the buffer 126. The generation speed of the robot control commands is by far higher than the actual operations of the robots 41 to 4n, the waiting time in this apparatus 121 does not at all affect the practical operations of the robots 41 to 4n even when the work names are continuously sent to the buffer 126. The robot control command so generated is sent to the guidance-control equipment 2 through the communication controller 15 to operate the robots 41 to 4n, or is sent to the work simulation equipment 13 to conduct simulation.

The work simulation equipment 13 is analogous to a system comprising the guidance-control equipment 2 and the robots 41 to 4n.

This work simulation equipment 13 may be a simulation equipment, which is equipped with the robots, in practice, or a simulation which is expressed on a computer program.

Simulation of the operations of the robots 41 to 4n and simulation of influences of the robot operations on the work object are conducted on the basis of the robot control command sent from the work interpretation apparatus 121. The simulation result is computed in a predetermined cycle by the work interpretation apparatus 121 and is written in the form of the work environment model into the virtual work environment map memory 125.

The communication controller 15 sends the robot control command which the work interpretation apparatus 121 generates, to the guidance-control equipment 2, and sends the work environment model, which is sent from the guidance-control equipment 2, to the work environment map memory 124 through the buffer 16.

A display device 14 reproduces the condition of the work environment or the condition of simulation on the basis of the work environment model written into the work environment map memory 124 or into the virtual work environment map memory 125, and displays the condition of work environment or simulation.

The communication controller 23 of the guidance-control equipment 2 receives the robot control command from the program assistance equipment 1 and sends it to the buffer 24, or sends the work environment model generated by an image processor 22 to the project assistance equipment 1. A controller 21 sequentially reads the robot control commands stored in the buffer 24, and selects and operates the robots 41 to 4n in accordance with the given work.

The image processor 22 generates the work environment model from the images of the work environment shot by a camera 3, and sends it to the communication controller 23.

The camera 3 shoots the work environment including the robots 41 to 4n. The robots 41 to 4n are selected by the controller 21 and execute the work in accordance with the command sent from the controller 21.

Next, the data which this remote operation apparatus handles will be explained.

[Program Configuration]

Figure 3:
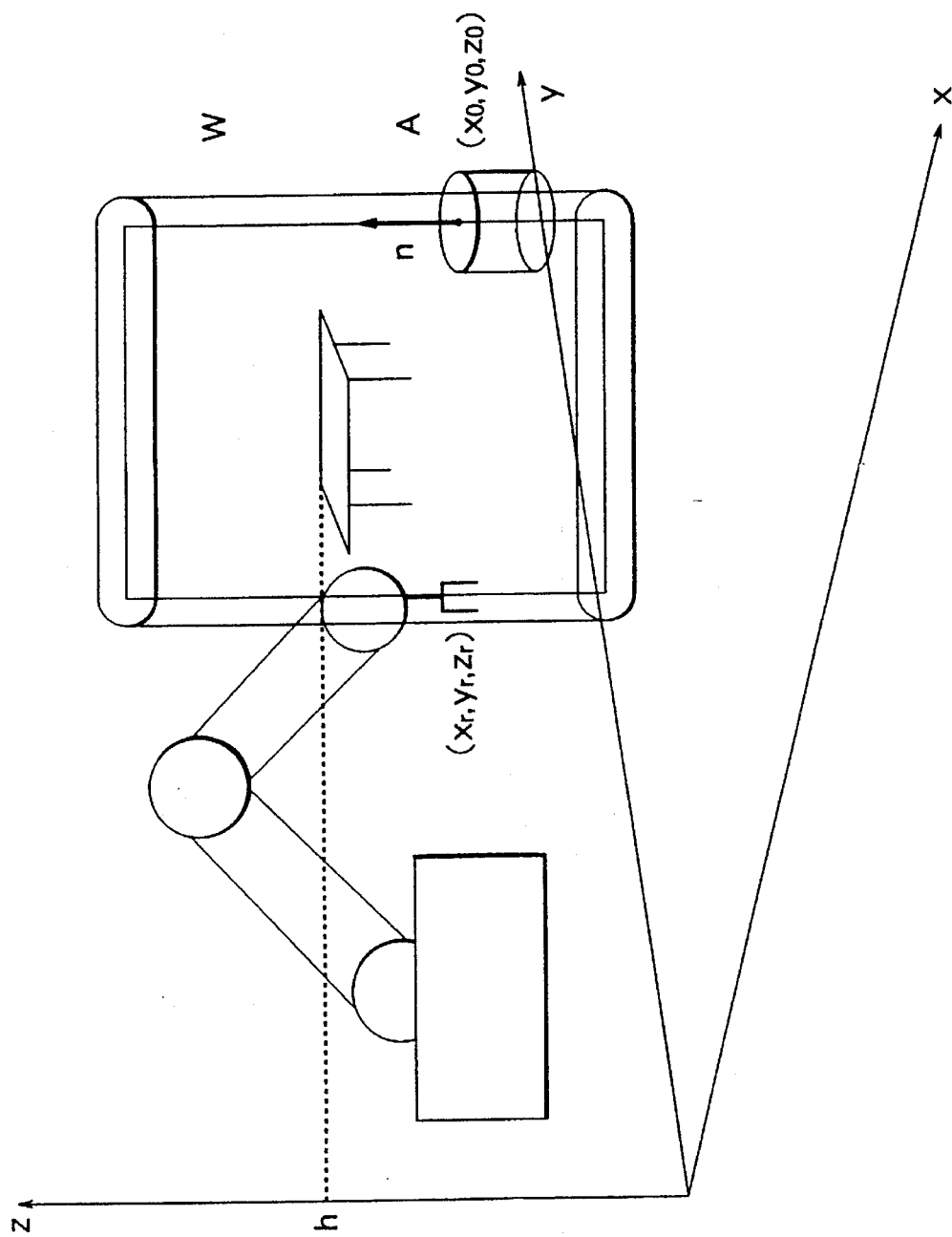
FIG. 3 is a table showing an example of work elements for executing the work program in an embodiment of the present invention.

The program in this remote operation apparatus is divided into two hierarchies. One is a work element as the minimum unit of a work which cannot be divided more finely any longer, and the other is a work network which forms one unit of works by combining the work elements. As shown in FIGS. 2 and 3, the work element 4003 comprises [grip] of the work name 4001 and a procedure 4002 which is executed when the work name is called. In the work network, [transport] of the work name 3001, [exchange] of 3003, and [grip A]→[movement B]→[placing B] of the work 3002 of the lower order, [transport (A, D)]→[transport (B, E)]→[transport (A, C)]→[transport (B, A)], that are executed when the work name 3001 is called out, are described in the sequence of execution. It is the portions of the work networks 3005, 3006 in this apparatus at which programming is possible. The work element 4003 is in advance stored in a work element memory 1232 of the work program memory 123, and the work networks 3005, 3006 are stored in a work network memory 1231 of the work program memory 123 by the operation of the program input device 111.

[Work Environment Model]

When the work program is generated, concrete coordinates values of the robots and the operation object are not directly caught by the eyes of the operator. When the work program is practically carried out, the concrete coordinates values of the robots and the operation object are obtained by gaining access to the work environment map memory 124 or to the virtual work environment map memory 125 on the basis of the time schedule read by the work interpretation apparatus 121 from the buffer memory 126.

The processing result is written in the form of the work environment model shown in FIG. 6 into the work environment map memory 124 or the virtual work environment map memory 125. FIG. 6 shows an example of the work environment model. The work environment model for each of the robot existing in a work object region, an article as the object of the work and an article which might hinder the work, comprises an object number 5001 of each article, a coordinates value 5002 at that position, a direction (normal vector) 5003, an object number of a supporting article and a mode of supporting (existing on, screwed into, bonded to) 5004, and a shape (an article is described as an aggregate of planes encompassing the article, and is described as an aggregate of apex of each plane) 5005. Each row of the shape 5005 corresponds to each plane.

[Time Schedule]

The time schedule describes which work is to be executed at which time. FIG. 7 shows an example of such a time schedule. As shown in FIG. 7, the time schedule comprises the combination of the work name 2002, e.g. transport, removal, exchange, and the time 2001 at which the work is executed. The time schedule is generated by the time schedule input device 112 and is preserved by the time schedule controller 122.

Next, the operation of the apparatus of this embodiment will be explained from two aspects, i.e. robot control and generation of the work program.

[Robot Control]

Figure 8:
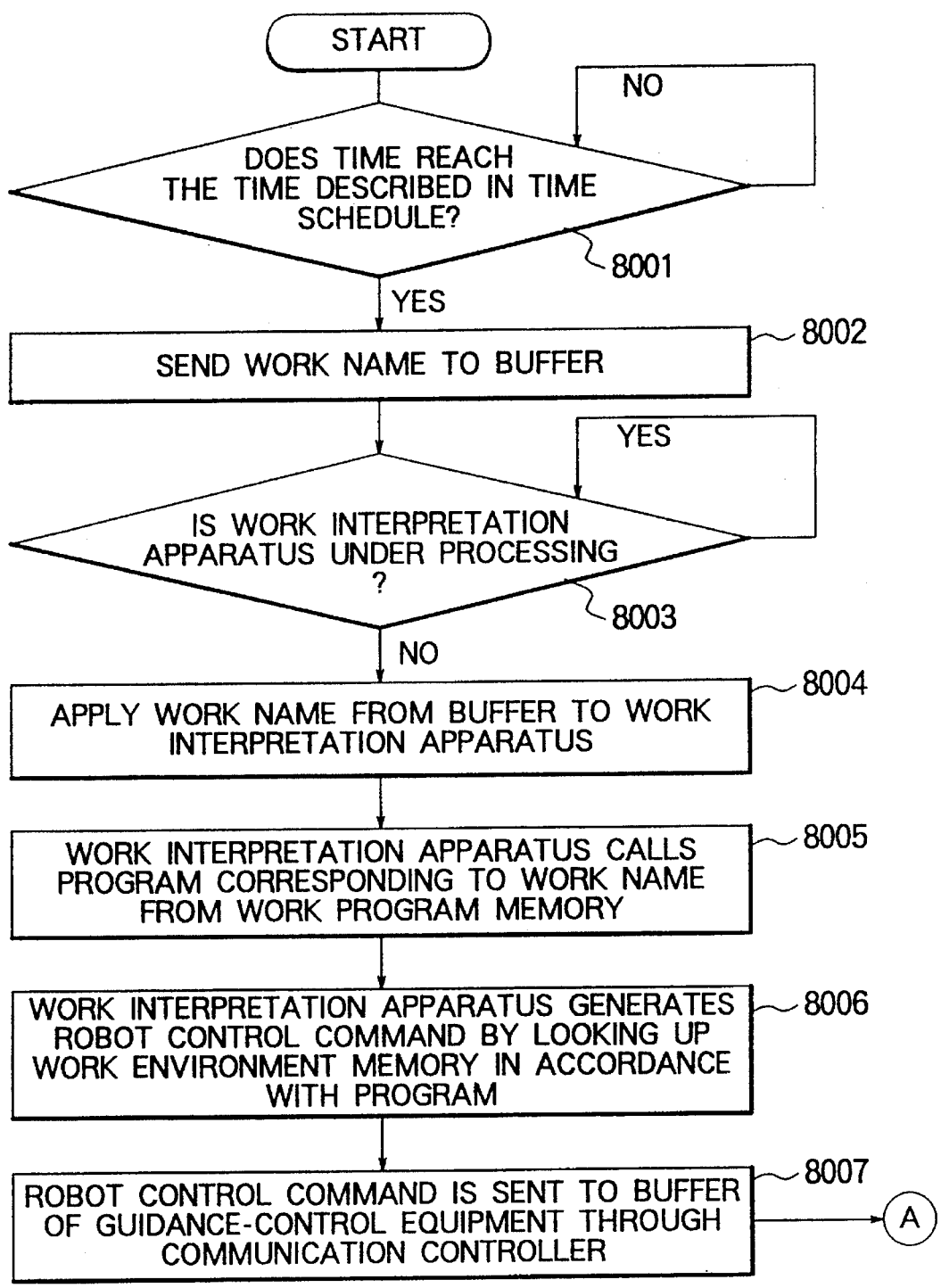
FIG. 8 is a flowchart showing an example of the flow of processing when a robot is controlled in an embodiment of the present invention.
Figure 9:
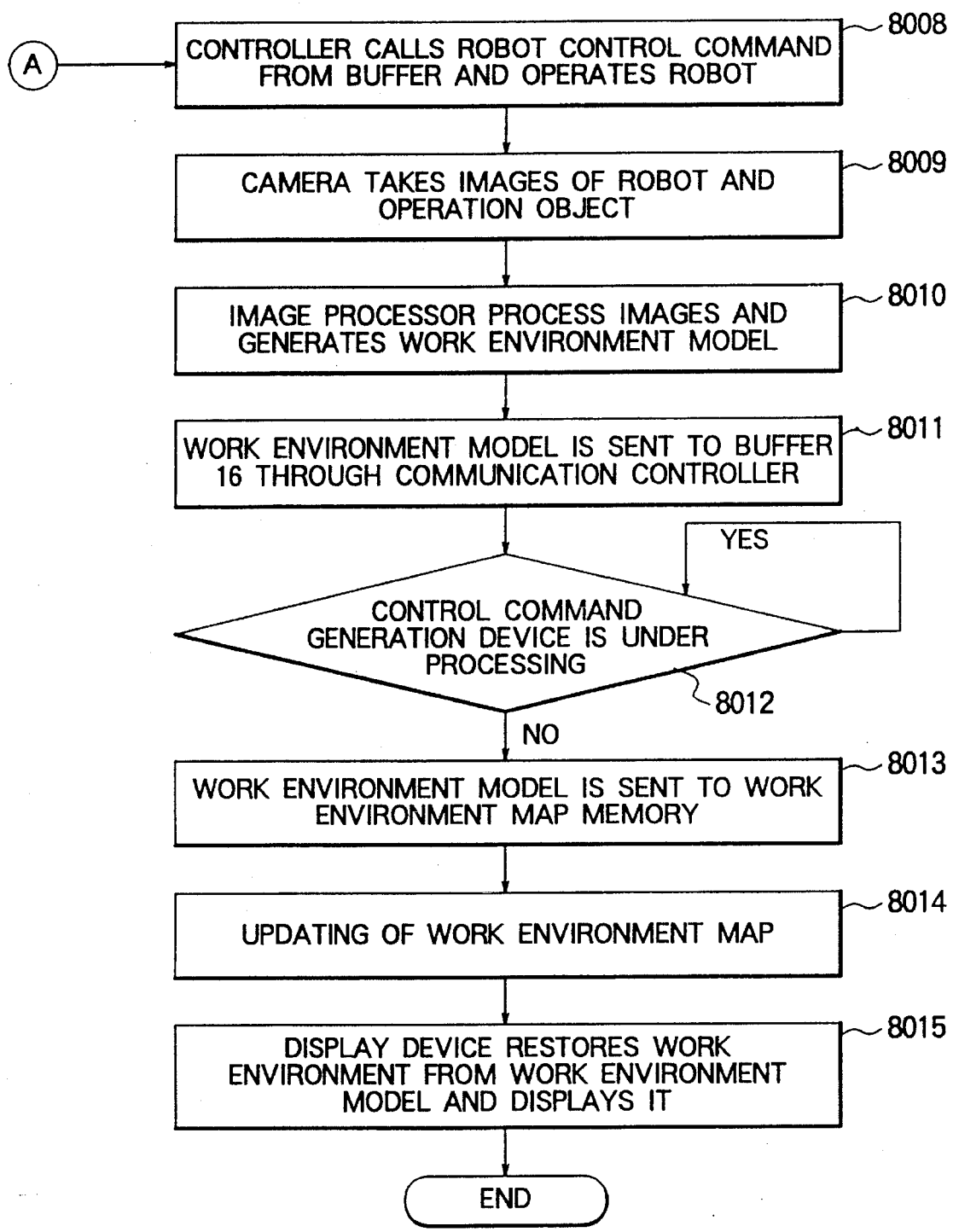
FIG. 9 is a flowchart showing an example of the flow of processing when the robot is controlled in an embodiment of the present invention.

The mode of operations of this apparatus for selecting and controlling the robots 41 to 4n in accordance with the time schedule of the work written into the time schedule controller 122 and with the program of the work written into the work program memory 123 will be described with reference to flowcharts of FIGS. 8 and 9. The time schedule is preserved in the time schedule controller 122, and comprises the work name and the time at which the work should be executed, as shown in FIG. 7. When the time at which each work should be executed is reached (step 8001), the work name is sent from the time schedule controller 122 to the buffer 126 (step 8002) and is applied to the work interpretation apparatus 121 when this apparatus 121 is out of processing (step 8004). When the work interpretation apparatus 121 is under processing, the work name is applied after the processing is finished.

The work interpretation apparatus 121 calls the program (the work network and the work element) corresponding to the work name fetched from the buffer 126 from the work program memory 123 (step 8005), looks up the work environment map memory 124 and generates the robot control command (step 8006). This generation process will be described more definitely in [Generation of Robot Control Command].

The robot control command is sent to the guidance-control equipment 2 through the communication controller 15 (step 8007) and is stored in the buffer 24. The controller 21 reads out this robot control command from the buffer 24, and selects and controls the robots 41 to 4n in accordance with the work (step 8008). The images of the robots 41 to 4n and the work object are taken in a predetermined cycle by the camera 3 (step 8009), and the images so shot are covered by the image processor 22 into the work environment model (step 8010). The conversion method is described in JP-A-2-137072. The work environment model is sent to the work environment map memory 124 through the communication controller 23, the communication controller 15 and the buffer 16 (step 8011; step 8013), and the work environment map (model) is updated (step 8014). When the work interpretation apparatus 121 generates the robot control command, the work environment model is stored in the buffer 16. The display device 14 restores the work environment from the work environment map 124 and displays it (step 8015). The method which restores the work environment and displays it as the images is described in JP-A-2-137072.

[Generation of Work Program]

It would be ideal if the robots 41 to 4n operate in accordance with the work program first given to them. In consideration of repair of a satellite or an atomic power plant, however, there might be the case where the work object has got deteriorated. In such a case, there may be the case where the work set to the remote operation apparatus cannot be executed as first expected, due to the shape of the work object or due to the change of intensity. The work program must be changed in such a case. To change the work program, the time schedule may be changed in some cases within the range of the list of the existing works, and works must be afresh programmed in other cases. The operation of the apparatus at this time will be dividedly explained about the case of the change of the time schedule of the works, and the case of programming of the new works.

Figure 10:
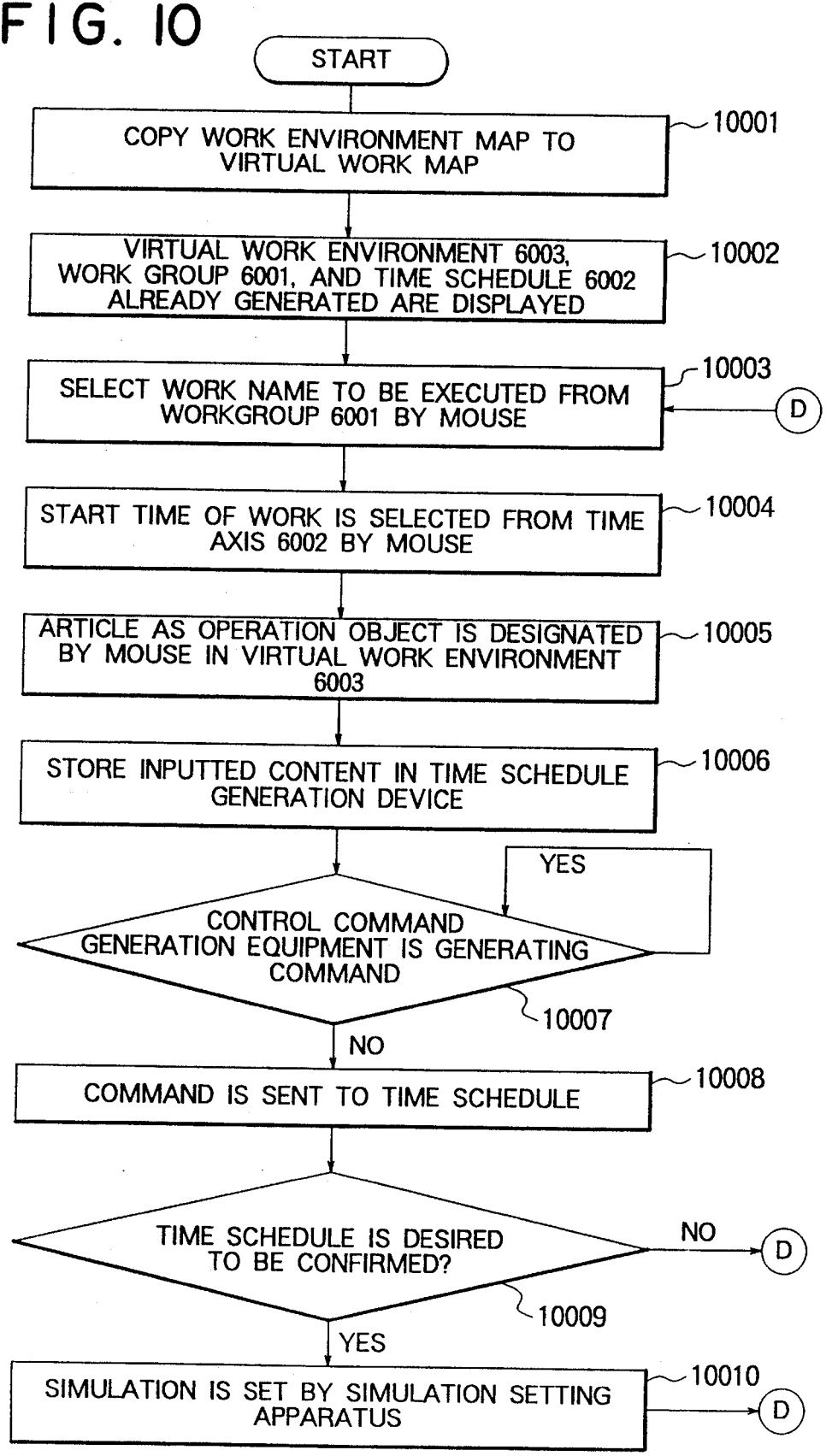
FIG. 10 is a flowchart showing an example of the flow of processing when a work program is generated in an embodiment of the present invention.
Figure 11:
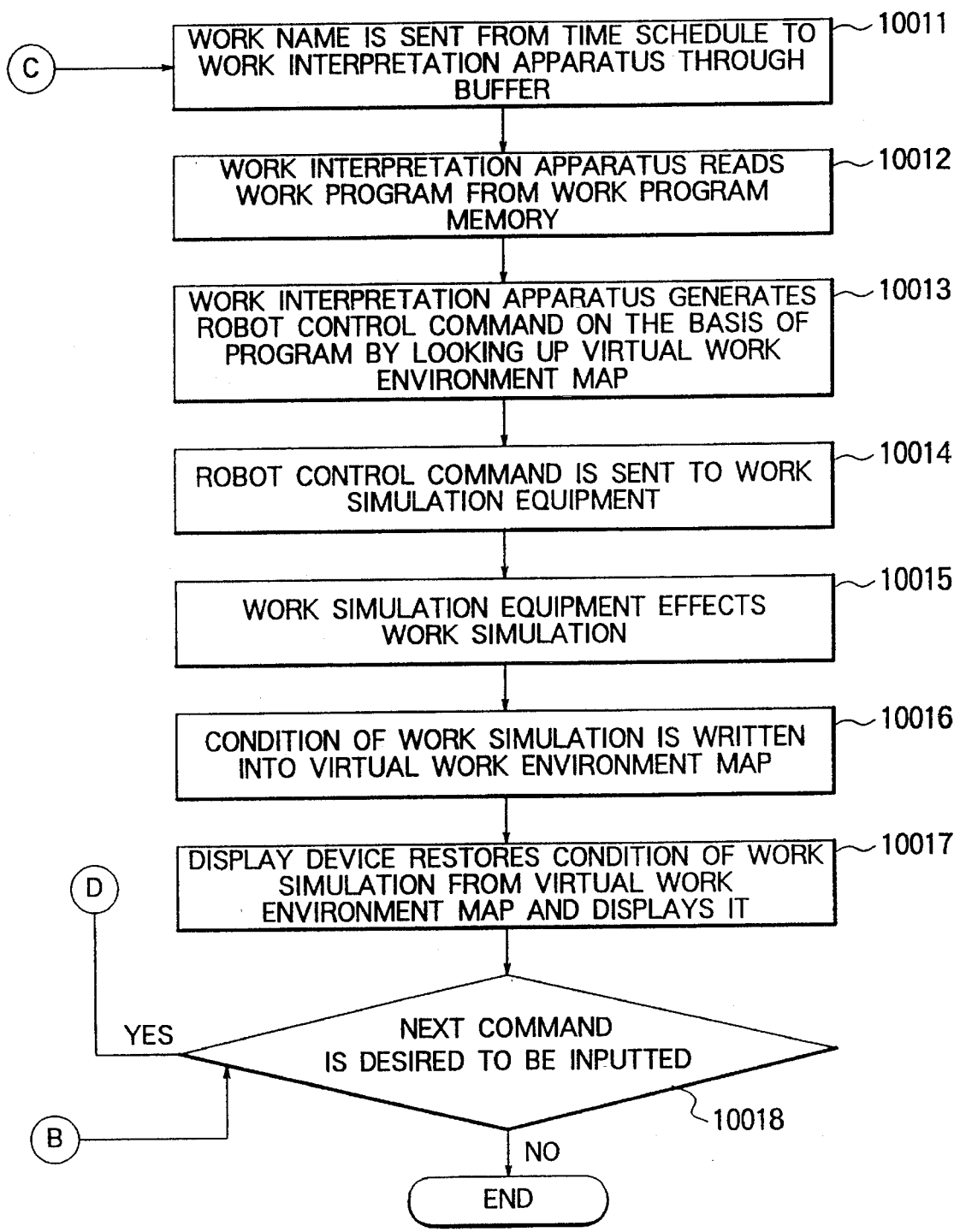
FIG. 11 is a flowchart showing an example of the flow of processing when the work program is generated in an embodiment of the present invention.
Figure 12:
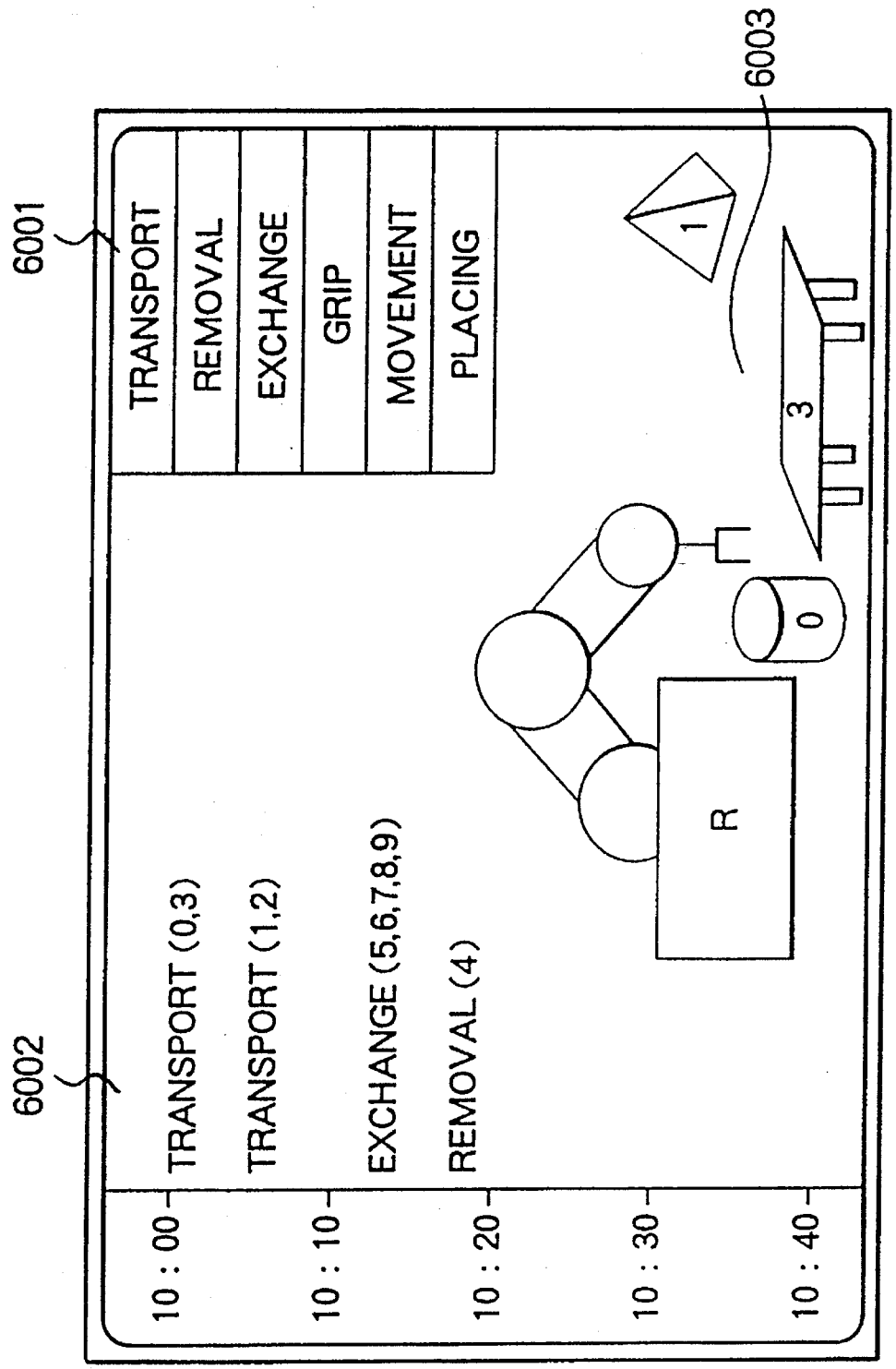
FIG. 12 is a view showing an example of screen display of an input apparatus for generating a time schedule in an embodiment of the present invention.

First, the operation of the apparatus at the time of the change of the time schedule will be explained with reference to FIGS. 10 and 11. The time of the work comprises the work name and the time at which the work is executed, as shown in FIG. 7. The time schedule is generated on the time schedule input device 112. To generate the time schedule, the content of the work environment map memory 124 is copied to the virtual work environment map memory 125 (step 10001). Then, a screen showing the model before the change shown in FIG. 12 is displayed (10002), and the work name is selected from the group of works 6001, which are already defined, on the right side of the screen, i.e. transport, removable, exchange, grip, movement and placing (step 10003). The start time of transport, transport, exchange and removal of the work is designated by a mouse from a time axis of the time schedule 6002 (step 10004). Next, an article as the work object is selected from the work environment screen 6003 by the mouse (step 10005). The time schedule so generated is temporarily stored in the time schedule input device 112 (step 10006), and is transferred to the buffer 126 in the control command generation apparatus 12 by the time schedule controller when the control command generation apparatus 12 does not generate the robot control command (robot control program) (step 10008).

To confirm the time schedule, the time for effecting simulation by the simulation setting apparatus 113 and the speed of simulation are set (step 10010). Then, the simulation setting apparatus 113 sends one by one the work names from the time schedule controller 122 in accordance with this condition setting of simulation to the work interpretation apparatus 121 (step 10011), and the program written into the work program memory 123 is called out (step 10012). The robot control command is generated while the virtual work environment map memory 125 is being looked up (step 10013). The robot control command is sent to the work simulation equipment (10014), where simulation is conducted (step 10015). The condition of simulation is written into the virtual work environment map memory 125 (step 10016). The display device 14 restores the condition of simulation from the work environment model written into the virtual work environment map memory 125 and displays it (step 10017). The operator can confirm appropriateness of the time schedule from this simulation condition.

Figure 13:
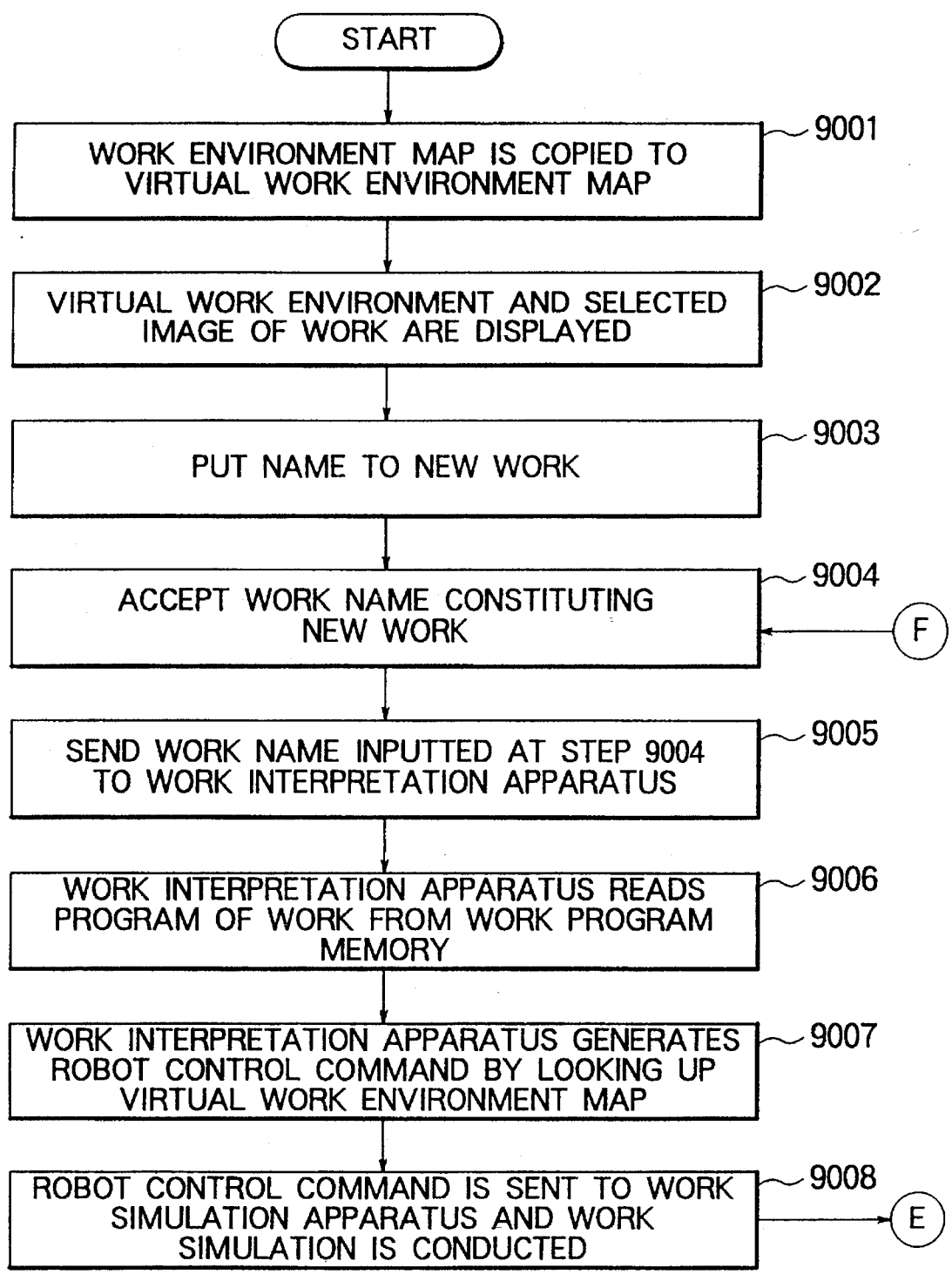
FIG. 13 is a flowchart showing an example of the flow of processing when the work program is generated in an embodiment of the present invention.
Figure 14:
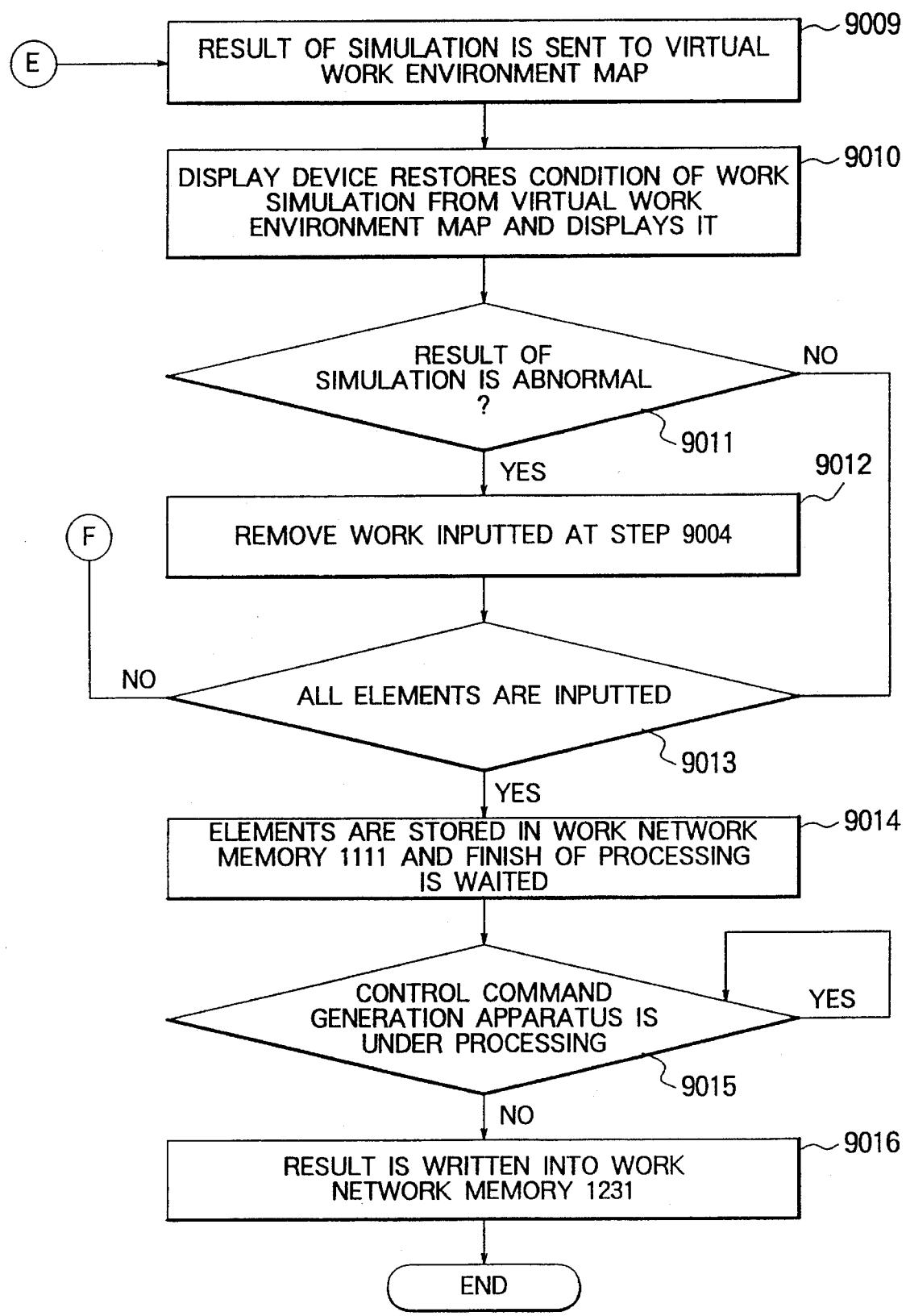
FIG. 14 is a flowchart showing an example of the flow of processing when the work program is generated in an embodiment of the present invention.

Next, the operation of the apparatus when a new work is programmed will be explained with reference to the flowcharts of FIGS. 13 and 14. The work program comprises the work element and the work network (refer to [Program Configuration]). In this apparatus, programming can be made by generating a work network of a new work. Programming of the new work is made on the program input device 111.

Figure 15:
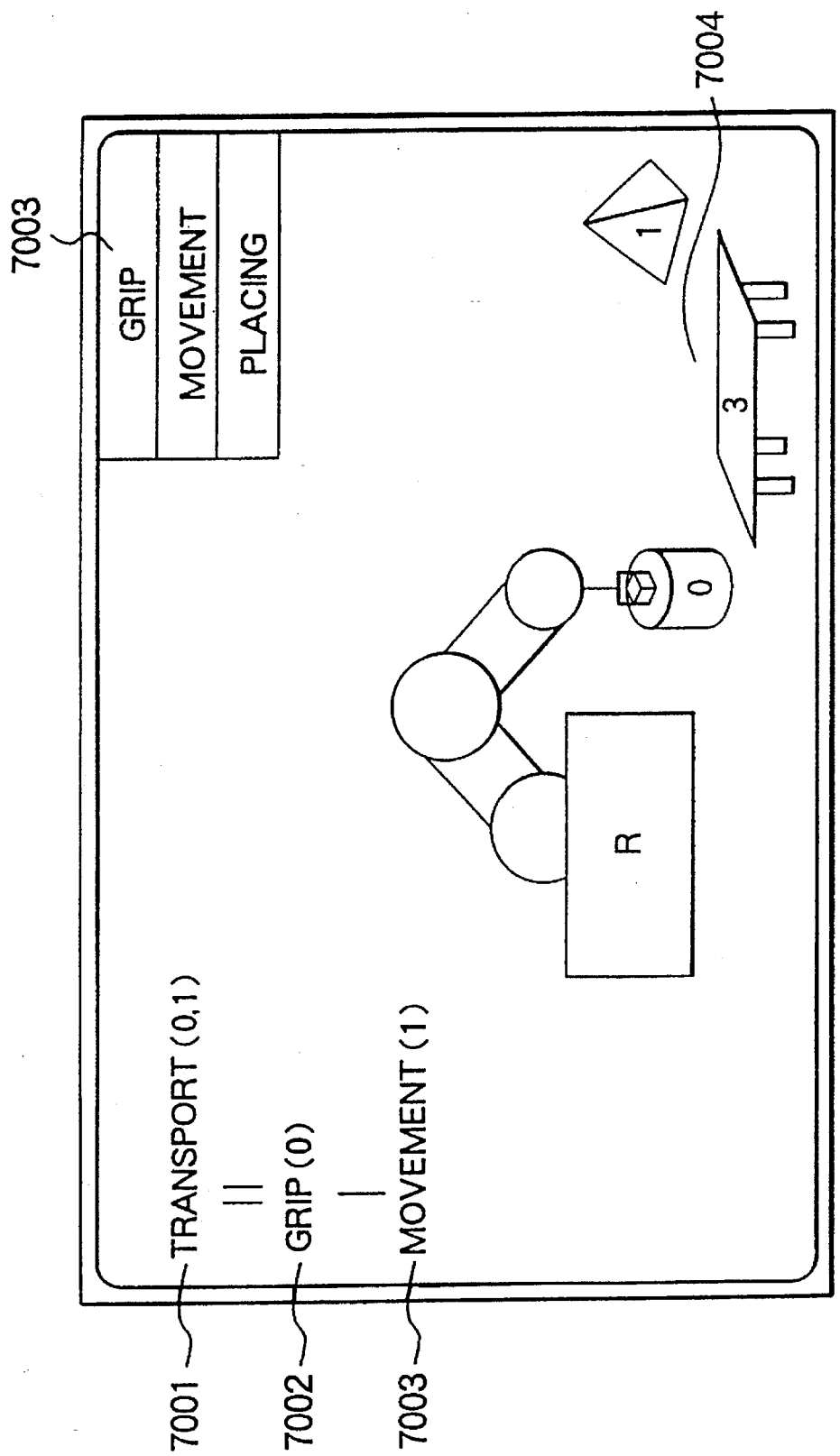
FIG. 15 is a view showing an example of a screen display of an input apparatus for programming a work in an embodiment of the present invention.

To conduct programming, the content of the work environment map memory 124 is copied to the virtual work environment map memory 125 (step 9001), and the screen of the present work environment model shown in FIG. 15 is displayed (step 9003). When the new work name (transport 7001 in FIG. 15) is inputted from a keyboard (step 9003), the work as the first step for forming the work (grip 7002 in FIG. 15) is required to be selected from the group of works 7003, i.e. grip, movement, placing, shown on the right side of the screen (step 9004). When the work is selected by the mouse, this work is sent to the work interpretation apparatus 121 (step 9005). Then, the work interpretation apparatus 121 calls out this program element from the work program memory 123 (step 9006), looks up the virtual work environment map memory 125 and expands it to the robot control command (step 9007). The robot control command is sent to the work simulation apparatus 13, where work simulation is effected (step 9008). The condition of work simulation is written into the virtual work environment map memory 125 (step 9009), and the display device 14 restores the condition 7004 of work simulation from the virtual work environment map memory 125 and displays it (step 9010). If the condition of simulation proves as first expected, the work as the next element (movement (1)7005 in FIG. 15) is inputted (step 9004), and if the condition of simulation is not effected as first expected, the inputted work name is deleted (step 9012), and another work name is again inputted.

As described above, the operator can make programming while watching the simulation condition. Accordingly, it is easy for the operator to grasp the flow of the works. When programming of one work is finished, it is temporarily stored in the work network memory 1111 in the program input device (step 9014) and then the work network memory 1231 is re-written when the control command generation apparatus 12 does not generate the robot control command (step 9016).

Next, a method of restoring a failure, when the work fails, by the use of the method of "Change of Time Schedule of Work" and "Programming of New Work" described in [Generation of Work program], will be described with reference to a definite work example.

Figures 16A, 16B:
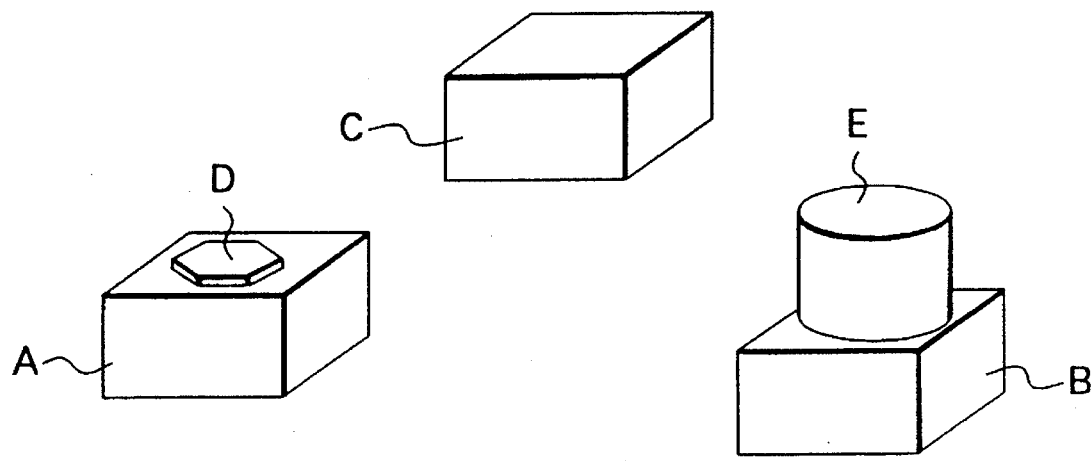
FIGS. 16A and 16B are a model view and a time schedule storing a restoration procedure from a work failure state.

It will be hereby assumed that three boxes A, B and C exist as shown in FIG. 16A, a screw D is fastened to the box A and a circular cylinder E is placed on the box B. It will be further assumed that a replacing work of putting the screw D on the box B and putting the circular cylinder E on the box A is desired to be carried out. In this instance, it will be assumed that the works prepared are five, i.e. "grip", "movement", "placing", "removing the screw", and "transport" comprising the combination of "grip", "movement" and "placing".

Assuming that the time schedule shown in FIG. 16B is set up by the time schedule input device 112, even when "grip (D)" as an element constituting the work "transport (D, E)" is executed, the subsequent work cannot be carried out because the screw is fastened. Accordingly, the work project must be corrected.

If the time schedule is left as such, transport (E, A) and transport (D, B) are executed when the time is due, and damage would be great. Therefore, these two works should not be executed.

Therefore, the operation times of these two commands are retarded by the time schedule input device 112 by the time sufficient enough to prepare once again the program.

Next, "transport 2" for removing the screw and placing it on the box is generated by the program input apparatus 112 in place of "transport". As represented by the method of [Programming of New Work], this can be made by combining "removal of screw", "movement" and "placing". After programming of the necessary work is finished in this way, the execution time of each of transport 2(D, C), transport (E, A) and transport (D, B) is designated by the time schedule input device 112. By this method can be failure state be restored, and the work can be executed as first desired.

Next, a method of solving the problem when any component defect is found out will be described with reference to a concrete work example.

Figures 17A, 17B, 17C:
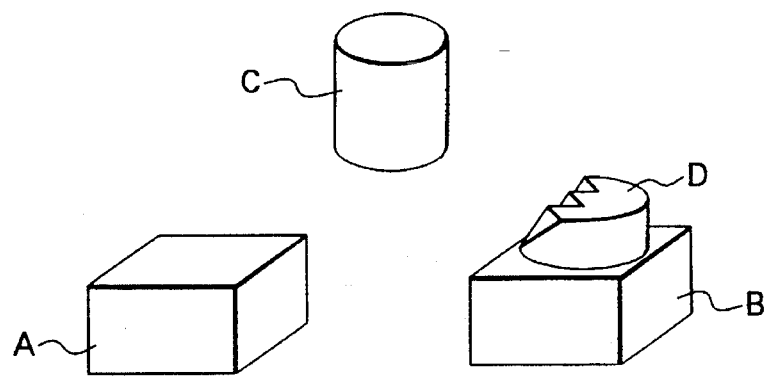
FIGS. 17A, 17B and 17C are a model view and time schedules.
Figure 18:
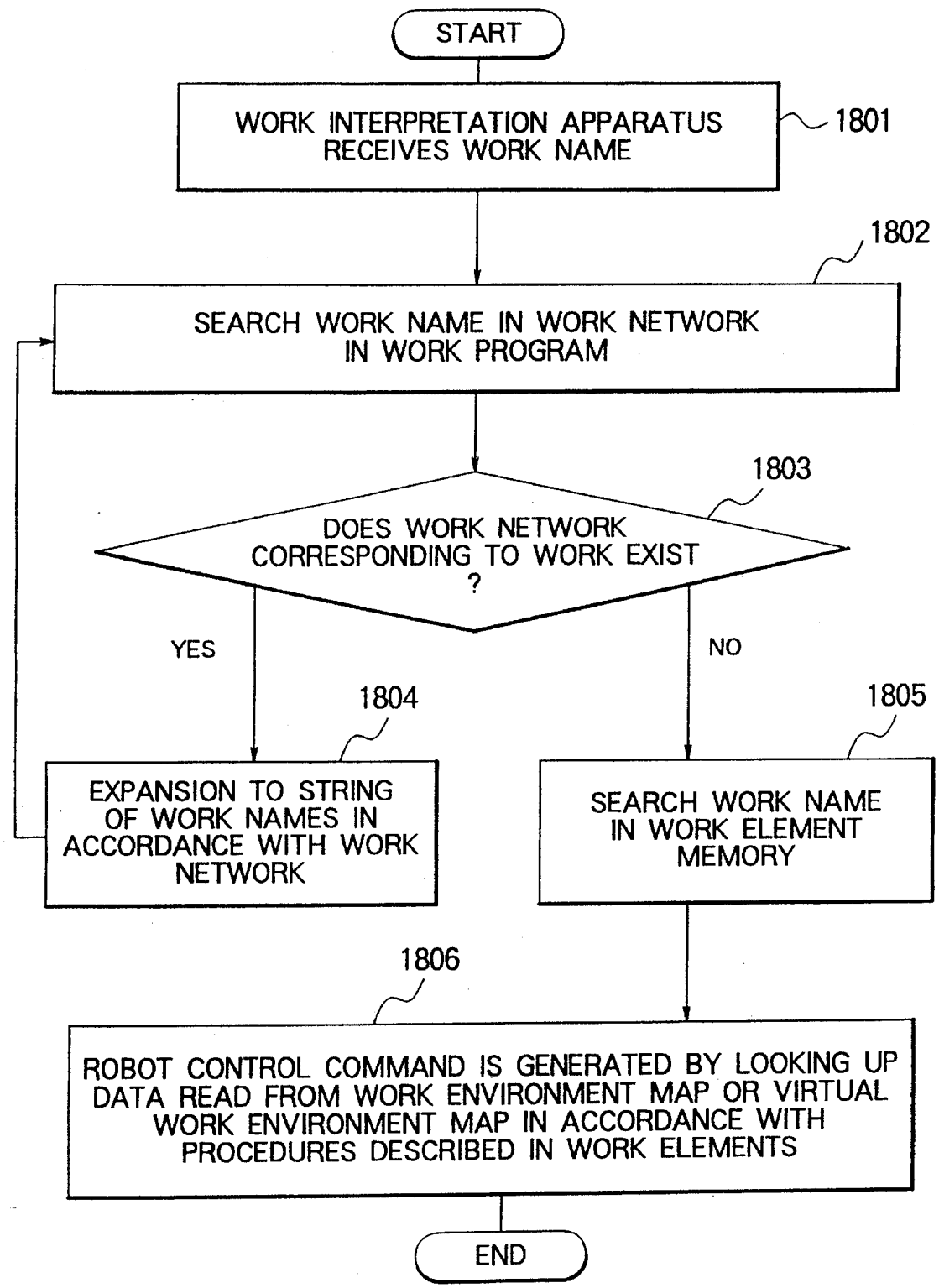
FIG. 18 is a flowchart showing a procedure for generating a robot control command.

It will be hereby assumed that two boxes exist as shown in FIG. 17A, and a circular cylinder D fitted into a box B breaks off. In this case, the procedure of the work for replacing the circular cylinder D by a circular cylinder C must be added to the work program.

It will be assumed that a time schedule shown in FIG. 17B exists, and break of the circular cylinder D is found out from display of the display device 14 after the command 2 is executed. The method of changing the time schedule at this time will be explained.

First, if the time schedule is left as it is, the commands 3 et seq are executed when the respective time is due, and damage would be great. Therefore, the execution of these command must be prevented. The operation time of each command is therefore retarded by the time schedule input device 112 by a time sufficient enough to add a time schedule. Next, transport (D, A) and transport (C, B) are added after the command 2 by the time schedule input device 112, as shown in FIG. 17C. Addition of such a time schedule can replace the defective component by a normal component, and a desired work can be executed.

Before the time schedule, which is generated so as to restore from the work failure and to cope with break of the component shown in FIGS. 16A, B, C and 17A, B, C is executed in practice, it is possible to set the simulation time from the simulation setting apparatus 113, to confirm simulation by the virtual work environment map memory 125 and the work simulation equipment 13 on the display device 14, and to further apply correction, if necessary. The time schedule confirmed by simulation is set as the practical operation to the time schedule controller 122 by re-setting from the time schedule input apparatus 112.

[Generation of Robot Control Command]

Figure 4:
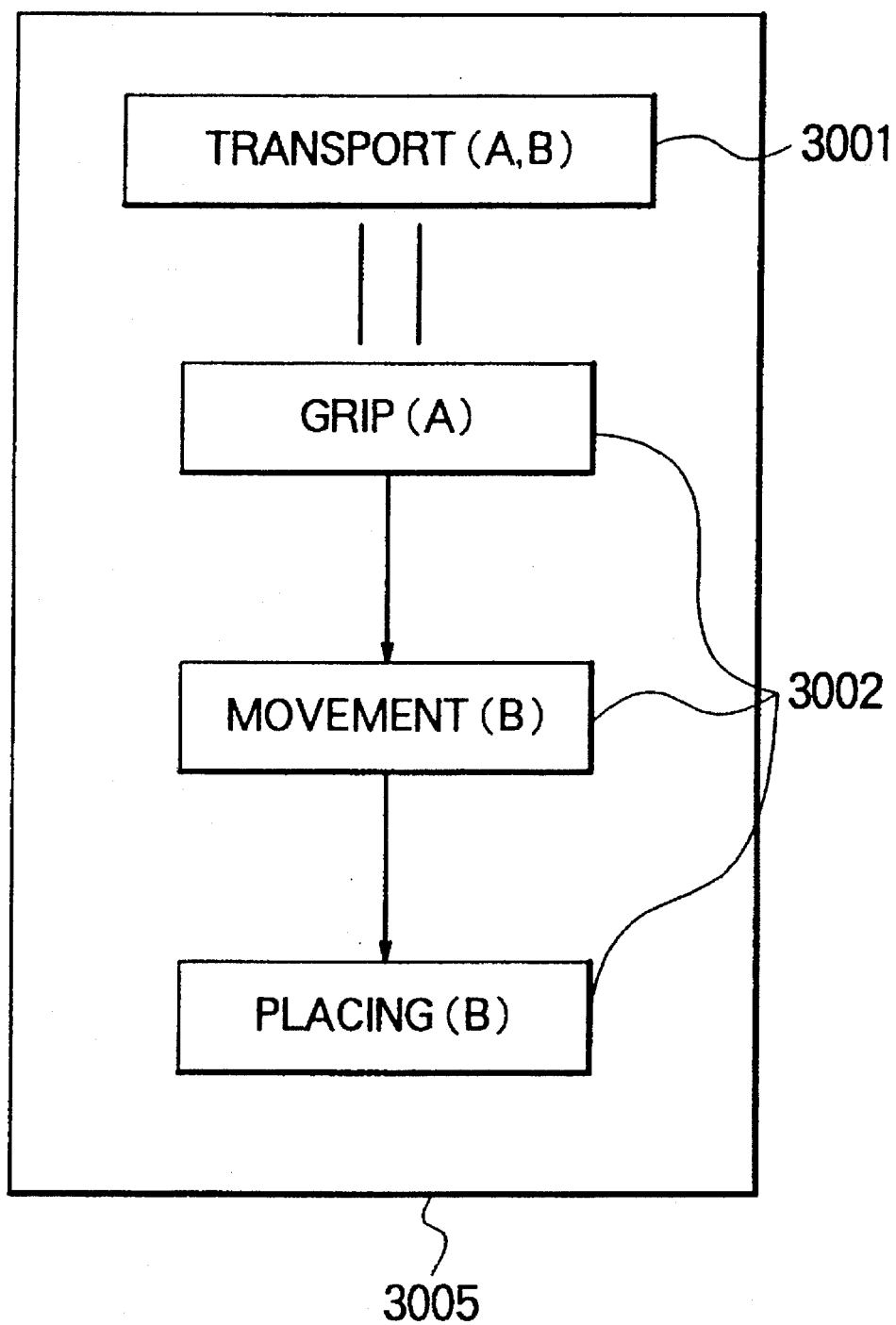
FIG. 4 is a table showing an example of a work network for executing the work program in an embodiment of the present invention.
Figure 5:
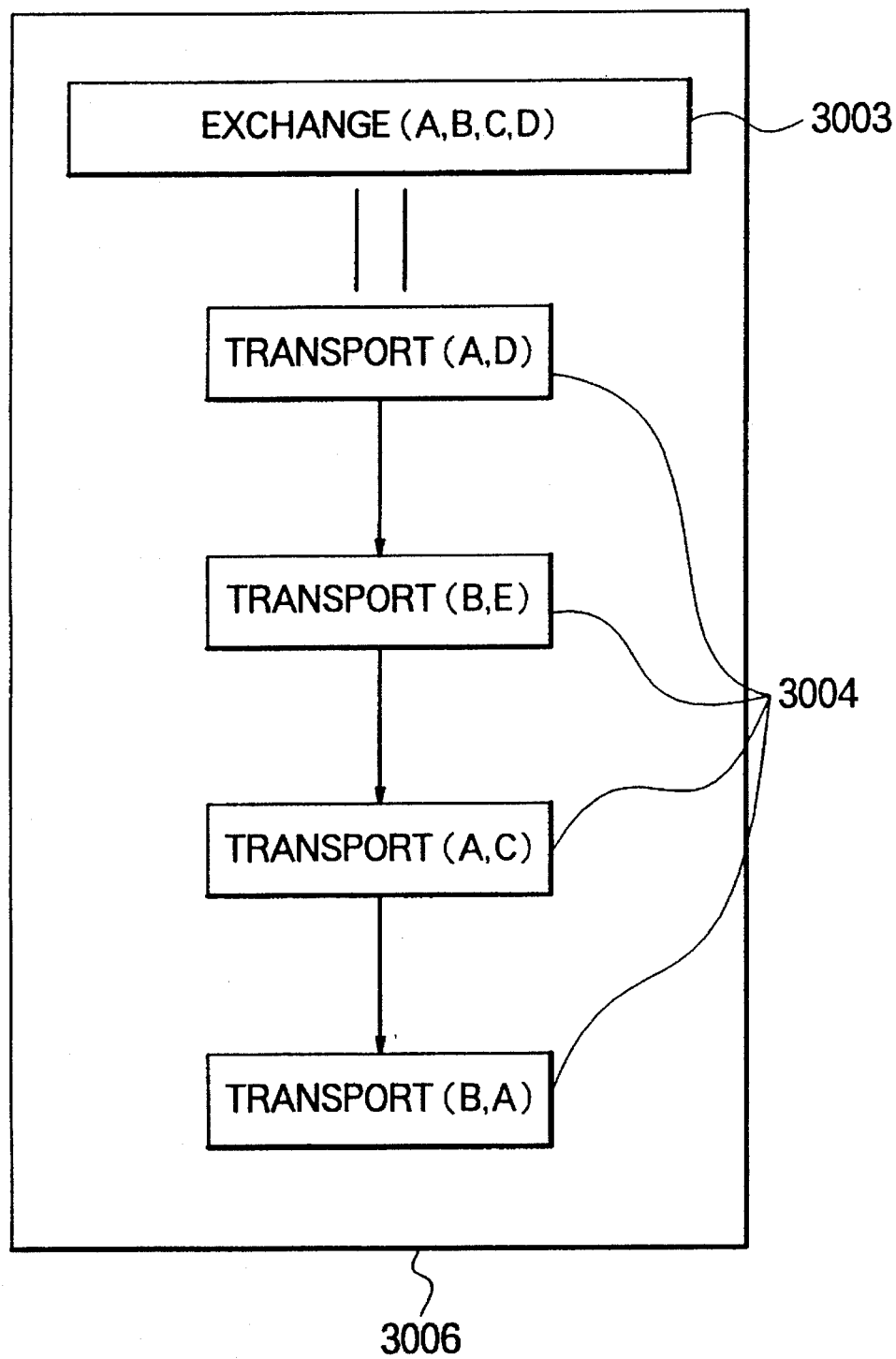
FIG. 5 is a table showing an example of the work network for executing a work program in an embodiment of the present invention.

The operation of the work interpretation apparatus when the robot control command is generated from the work program will be explained. Receiving the work name such as transport (obj0, obj1) (step 1801), the work interpretation apparatus 121 searches the work network of transport of the work network memory 1231 in the work program 123. When the work network 3005 of transport is found out (step 1603), A of transport A, B shown in FIG. 4 is replaced by obj0, and B, by obj1. Then, three works; i.e. grip (obj0), movement (obj1) and placing (obj1), are generated (step 1804). Though the work network of each of these three work is search, the work element of each of time is searched in the work element memory 1232 (step 1805) because definition is not made in this example. The work element 4003 shown in FIG. 2 is the work element of grip. When grip (obj0) is called, A in the work element is replaced by obj0, and the robot control command is generated in accordance with the procedure 4002 described in the work element by referring to the data read from the work environment map memory 124 or the virtual work environment map memory 125 (step 1806).

According to this embodiment, the work program can be generated and changed while operating the robot as the work can be constituted into a series of operations defined by a specific language. Programming can be made while confirming how the content of a new program operates when the new work is programmed.

The work interpretation apparatus 121, the work program memory 123 and the work environment map memory 124 are provided inside the control command generation apparatus 12, and when the work name and the operation time are written into the time schedule 123, the work interpretation apparatus 121 expands them into the robot control command while looking up the work environment map memory 124 in accordance with the procedure existing in the work program memory 123, and the guidance-control equipment 2 operates the robot 4 on the basis of the robot control command. In this way, the robot 4 can be operated by inputting the work program.

The guidance-control equipment 2, the control command generation apparatus 12 and the input device 11 operate discretely and in parallel with one another, and the role of always monitoring the robot 4 is played by the guidance-control equipment 2 so that the control command generation apparatus 12 can exclusively preserve the work program and generate the robot control command. Accordingly, the time in which the control command generation apparatus 12 is relieved of the operation for operating the robot can be secured and in the mean time, the work program stored in the input apparatus 11 is transferred to the control command generation apparatus 12. In this way, the work program can be changed without hindering the operation of the robot.

When the operation of a new work is defined, an inputted step is transferred to the work interpretation apparatus 121 whenever a program is inputted by one step, and the robot control command is generated by the work interpretation apparatus 121 while looking up the work program memory 123 and the virtual work environment map 125, and is then sent to the work simulation apparatus 13, where work simulation is conducted. The condition of simulation is displayed by the display device 14. As a result, programming can be made while the operation of the content which is under programming is being confirmed.

We claim:

1. A remote control apparatus comprising:

guidance-control equipment disposed at a site of a work at which an operation object is positioned, and including image processing means for executing image processing of a condition of said operation object and a condition of an operation appliance for applying a predetermined operation to said operation object and generating work environment data, and control means for inputting a series of operation data of said operation appliance inputted from outside and controlling said operation appliance on the basis of said operation data;

an input apparatus disposed at a position spaced apart from said site of the work, and including program input means for inputting a work program determining the operation of said operation appliance, and time schedule input means for inputting a time schedule as an actuation timing of the operation of said operation appliance determined by said work program; and a control command generation apparatus including a work program memory for storing said work program generated by said program input means, a time schedule controller for storing said time schedule from said time schedule input means and outputting a work name at a timing set by said time schedule, work interpretation means for reading out a work program corresponding to the work name stored in said work program memory when the work name is outputted from said time schedule controller, generating a series of operation data of said operation appliance and sending said operation data to said guidance-control equipment, a work environment map memory for inputting and storing the work environment data outputted from said guidance-control-equipment, and display means capable of displaying a stored content of said work environment map memory.

2. A remote control apparatus according to claim 1, wherein said input apparatus further includes simulation setting means for setting a simulation time schedule as an execution timing of said work for a simulation operation of said operation appliance and outputting said simulation timing schedule to said time schedule controller, said control command generation apparatus further includes simulation means for simulating a condition of said operation object and a condition of said operation appliance, and said work interpretation means of said control command generation means reads out a work program corresponding to a work name stored in said work program memory when the work name is outputted on the basis of the simulation time schedule from said time schedule controller, and controls said simulation means.

3. A remote control apparatus according to claim 2, wherein said simulation timing schedule input means inputs a work name of simulation of said operation appliance and its execution time.

4. A remote control apparatus according to claim 2, wherein a work network comprising a combination of operations constituting a work corresponding to said work name is set to, and stored in, said operation program memory from said program input means, work elements each expressing an individual operation by operation data of a minimum level of said operation appliance are stored in advance in said operation program memory, and said operation interpretation means reads out a work network corresponding to a work name from said program memory when said work name is outputted from said time schedule controller on the basis of said simulation time schedule, reads out work elements corresponding to each of operation structuring said operation network, and generates a series of operation data of said operation appliance.

5. A remote control apparatus according to claim 2, wherein said simulation means includes operation simulation means for reproducing a condition of said operation object and a condition of an operation appliance for applying a predetermined operation to said operation object, either physically or on a program, and a virtual work environment map memory for copying and storing work environment data stored in said work environment memory means, and said control command generation apparatus conducts simulation on the basis of a simulation time schedule by said operation simulation means when operation data of said simulation means is generated so as to re-write the work environment data in said virtual work environment map memory.

6. A remote control apparatus according to claim 5, wherein said display means can further display said virtual work environment data stored in said virtual work environment map memory and said simulation time schedule taken into said work interpretation means.

7. A remote control apparatus according to claim 1, wherein said operation interpretation means of said control command generation apparatus takes in predetermined coordinates of said operation appliance and of said operation object from said work environment data stored in said work environment map memory, and generates a series of operation data of said operation appliance.

8. A remote control apparatus according to claim 7, wherein said display means can display said work environment data stored in said work environment map memory and said time schedule taken into said operation interpretation means.

9. A remote control apparatus according to claim 1, wherein said time schedule input means inputs a work name of said operation appliance and its actuation time.

10. A remote control apparatus according to claim 1, wherein a work network comprising a combination of operations constituting a work corresponding to said work name is set to, and stored in, said operation program memory from said program input means, work elements each expressing an individual operation by operation data of a minimum level of said operation appliance are stored in advance in said operation program memory, and said operation interpretation means reads out a work network corresponding to said work name from said program memory when said work name is outputted from said time schedule controller, reads out work elements corresponding to each of operation structuring said operation network, and generates a series of operation data of said operation appliance.

11. A remote control apparatus according to claim 1, wherein said work environment data expresses said operation appliance, said operation object, shapes and positions of articles affecting said work, and a relationship of their connection with other articles.

12. An operation method of a remote control apparatus for operating a work at an operation point spaced apart from a site of the work, comprising the steps of:

extracting a work environment at the site of the work, and sending it to the operation point;

displaying the work environment at the operation point;

programming in advance the work of the site of the work at the operation point and storing it;

setting a timing schedule of the execution of said program for each work;

generating work data for executing said program stored in accordance with said timing schedule, and sending said work data to the site of the work; and confirming display of the work environment and controlling said remote control apparatus.

13. An operation method of a remote control apparatus according to claim 12, wherein said work environment is a work environment model expressing an operation appliance, an operation object, and shapes and positions of articles affecting the work and a connection relationship with said articles with other articles, and said work data is generated by taking in predetermined coordinates from said work environment model to generate said work data at the time of the execution of said program.

14. An operation method of a remote control apparatus according to claim 12, wherein simulation of the operation of said operation appliance is carried out for said work environment at the time of the generation of said program, and a program is modified on the basis of the result of said simulation.

15. An operation method of a remote control apparatus according to claim 12, wherein said program is generated in such a manner that a work network comprising a combination of operations constituting said work is set, a work element expressing an individual operation by operation data of a minimum level of said operation appliance is in advance stored at an operation point of said remote control apparatus, a work name and its start time are set to said time schedule, a work network designated by said work name of said time schedule is read out when said time schedule is executed, and generation data on the basis of said work element set to said work network is generated.

* * * * *